US009925687B2

(12) United States Patent
Shaver et al.

(10) Patent No.: US 9,925,687 B2
(45) Date of Patent: Mar. 27, 2018

(54) SELF-ROTATING WOOD CUTTING TOOTH

(71) Applicants: Jarvis Rylan Shaver, Qualicum Beach (CA); David Alexander Pope, Nanoose Bay (CA)

(72) Inventors: Jarvis Rylan Shaver, Qualicum Beach (CA); David Alexander Pope, Nanoose Bay (CA)

(73) Assignee: David Pope, Nanoose Bay, BC (CA)

( * ) Notice: Subject to any disclaimer, the term of this patent is extended or adjusted under 35 U.S.C. 154(b) by 186 days.

(21) Appl. No.: 14/766,392

(22) PCT Filed: Feb. 7, 2014

(86) PCT No.: PCT/CA2014/000088
§ 371 (c)(1),
(2) Date: Aug. 6, 2015

(87) PCT Pub. No.: WO2014/121376
PCT Pub. Date: Aug. 14, 2014

(65) Prior Publication Data
US 2015/0360385 A1    Dec. 17, 2015

Related U.S. Application Data

(60) Provisional application No. 61/762,130, filed on Feb. 7, 2013.

(51) Int. Cl.
| B27B 5/29 | (2006.01) |
| A01G 23/081 | (2006.01) |
| B27B 33/12 | (2006.01) |
| B27B 33/02 | (2006.01) |
| B23D 61/06 | (2006.01) |
| B27B 33/08 | (2006.01) |

(52) U.S. Cl.
CPC ............ *B27B 33/12* (2013.01); *A01G 23/081* (2013.01); *B23D 61/06* (2013.01); *B27B 33/02* (2013.01); *B27B 33/08* (2013.01); *Y10T 83/9338* (2015.04)

(58) Field of Classification Search
CPC ...... A01G 23/081; B23D 61/04; B23D 61/06; B27B 33/02; B27B 33/08; B27B 33/12; Y10T 83/9326; Y10T 83/9329; Y10T 83/9331; Y10T 83/9333; Y10T 83/9336; Y10T 83/9338
See application file for complete search history.

(56) References Cited

U.S. PATENT DOCUMENTS

| 4,506,715 A | * | 3/1985 | Blackwell | B23C 5/207 |
| | | | | 144/133.1 |
| 4,738,291 A | | 4/1988 | Isley | |
| 5,135,035 A | | 8/1992 | Mills | |
| 5,211,212 A | * | 5/1993 | Carlson | A01G 23/091 |
| | | | | 144/241 |
| 5,644,965 A | * | 7/1997 | MacLennan | B23D 61/06 |
| | | | | 144/241 |
| 6,601,620 B1 | | 8/2003 | Monyak et al. | |
| 6,769,343 B2 | | 8/2004 | Disabatino | |

* cited by examiner

*Primary Examiner* — Stephen Choi
(74) *Attorney, Agent, or Firm* — Schwabe, Williamson & Wyatt, P.C.

(57) ABSTRACT

A self-rotating saw tooth and associated mount assembly for use in wood cutting, for example with the saw disc on a feller buncher. Each saw tooth configured to rotate about its own axis of rotation responsive to contact with wood during cutting. A saw disc specially configured for use with the self-rotating saw teeth.

14 Claims, 7 Drawing Sheets

SELF-ROTATING WOOD CUTTING TOOTH

CROSS REFERENCE TO RELATED APPLICATION

The present application is a national phase entry under 35 U.S.C. § 371 of International Application No. PCT/CA2014/000088, filed Feb. 7, 2014 entitled "SELF-ROTATING WOOD CUTTING TOOTH," which designated, among the various States, the United States of America, and claims priority to U.S. Provisional Patent Application No. 61/762,130, filed Feb. 7, 2013, the disclosures of which are hereby incorporated by reference.

FIELD OF THE INVENTION

The present invention relates to the field of wood cutting blades, more particularly saw discs of feller bunchers and teeth for saw discs of feller bunchers.

BACKGROUND OF THE INVENTION

A feller buncher is a type of harvester used in logging. It is a motorized vehicle with an attachment that can rapidly cut and gather (or bunch) the trees. The harvesting attachment consists of a tree-grabbing device and an associated cutting means. The usual tree cutting means comprises a circular saw, being a circular metal disc with cutting teeth arrayed about the circumferential periphery of the disc.

Feller buncher cutting teeth are replaceable, in that each cutting tooth is bolted to a tooth holder, being a projecting mount tang located at the circumferential periphery of the disc and having a hole therethrough. Known cutting teeth typically have four cutting edges arranged in a square, such that, as one cutting edge becomes worn, the tooth can be manually turned in 90 degree increments (by loosening and then re-tightening the tooth bolt), so as to move another of the cutting edges into the cutting position.

SUMMARY OF THE INVENTION

In one aspect, the present invention provides a self-rotating (or self-indexing) wood cutting tooth, including a replaceable saw tooth having a truncated conical body defining a circular cutting edge and an angled mount. In use, the angling of the saw tooth causes the tooth to turn in response to contact with the wood during cutting, tending to provide relatively uniform wear on the entire circular cutting edge prior to replacement.

The tooth's primary use is in the forest industry on various types of logging machines, one example being a feller buncher saw disc. The tooth assembly provides essentially automatic and essentially continuous rotation of the tooth as it cuts wood. The rotation of the tooth makes it unnecessary for an operator to shut down a machine to manually turn the tooth during its life cycle and tends to provide more even wear, and thus presumably longer life, than a conventional tooth.

In another aspect, the present invention provides a tooth assembly for use with a wood saw disc having a plurality of tooth mount tangs arrayed about the circumferential periphery of the saw disc, and having a disc plane of rotation and a disc axis of rotation, the tooth assembly including: a rotatable cutting tooth having a generally circular cutting edge and a tooth axis of rotation passing through the center of the circle defined by the circular cutting edge; and a retainer configured for use in attaching the rotatable cutting tooth to a mount tang so as to permit rotation of the cutting tooth about the tooth axis of rotation; wherein when mounted to a wood saw disc, in use the rotatable cutting tooth rotates about the tooth axis of rotation responsive to contact with the wood being cut.

When the rotatable cutting tooth is mounted to a mount tang, the tooth axis of rotation may intersect the disc plane of rotation at an angle greater than 0 degrees to about 7 degrees. When the rotatable cutting tooth is mounted to a mount tang the tooth axis of rotation may intersect the disc plane of rotation at an angle of about 3 degrees to about 6 degrees. When the rotatable cutting tooth is mounted to a mount tang, the tooth axis of rotation may intersect the disc plane of rotation at an angle of about 5 degrees.

The tooth assembly may include an adaptor plate that in use is interposed between a mount tang and the cutting tooth, wherein the adaptor and retainer are configured to cooperate to orient the cutting tooth such that when the rotatable cutting tooth is mounted to a mount tang the tooth axis of rotation intersects the disc plane of rotation at an angle greater than 0 degrees to about 7 degrees. The adaptor and retainer may be configured to cooperate to orient the cutting tooth such that when the rotatable cutting tooth is mounted to a mount tang the tooth axis of rotation intersects the disc plane of rotation at an angle of about 5 degrees.

The cutting edge may be substantially defined by the intersection of a conical external tooth surface having a tooth exterior apex angle and a conical interior tooth edge having an interior edge apex angle, wherein the difference between the tooth exterior apex angle the interior edge apex angle is about 71 degrees. The tooth exterior apex angle may be about 22 degrees and the interior edge apex angle may be about 93 degrees.

The cutting edge may be serrated, in that the cutting edge may include a plurality of declivities. The declivities may be substantially evenly spaced about the cutting edge and each declivity may have a curved interior contour.

The cutting edge may be asymmetrically serrated, in that the cutting edge may include a plurality of steps consisting of runs and projecting rises. The steps may be substantially evenly spaced about the cutting edge.

In another aspect, the present invention provides a tooth assembly for use with a wood saw disc having a plurality of tooth mount tangs arrayed about the circumferential periphery of the saw disc each mount tang having a tang tooth face defining a tang tooth face plane, and having a disc plane of rotation and a disc axis of rotation, the tooth assembly including: a rotatable cutting tooth having a generally circular cutting edge substantially defined by the intersection of a conical external tooth surface having a tooth exterior apex angle of about 22 degrees and a conical interior tooth edge having an interior edge apex angle of about 93 degrees, and a tooth axis of rotation passing through the center of the circle defined by the circular cutting edge; a retainer configured for use in attaching the rotatable cutting tooth to a mount tang so as to permit rotation of the cutting tooth about the tooth axis of rotation; and an adaptor plate that in use is interposed between the mount tang and the cutting tooth; wherein the adaptor and the retainer are configured to cooperate to orient the cutting tooth such that when the rotatable cutting tooth is mounted to a mount tang: the tooth axis of rotation intersects the disc plane of rotation at an angle of about 3 degrees to about 6 degrees; and the tooth axis of rotation intersects the tang tooth face plane at an angle of about 6 degrees to about 8 degrees; and whereby when mounted to a wood saw disc, in use the rotatable cutting tooth rotates about the tooth axis of rotation responsive to contact with the wood being cut.

The tooth axis of rotation may intersect the disc plane of rotation at an angle of about 4 degrees.

In another aspect, the present invention provides for a saw disc for use with rotatable teeth each having a tooth axis of rotation, tooth retainers and tooth mounting bolts, the saw disc having a disc plane of rotation, and including: a plurality of tooth mount tangs arrayed about the circumferential periphery of the saw disc, wherein each mount tang comprises: a tang tooth face defining a tang tooth face plane; a bolt hole for receiving a tooth mounting bolt, the bolt hole having: an end opening in the tang tooth face; and a hole longitudinal axis wherein the hole longitudinal axis intersects the disc plane of rotation at an angle greater than 0 degrees to about 7 degrees, and the hole longitudinal axis is substantially normal to the tang tooth face plane; wherein a rotatable tooth may be mounted to the mount tang with a retainer and a tooth mounting bolt, with the tooth axis of rotation aligned with the hole longitudinal axis.

The hole longitudinal axis may intersect the disc plane of rotation at an angle of about 3 degrees to 6 degrees. The hole longitudinal axis may intersect the disc plane of rotation at an angle of about 4 degrees.

DETAILED DESCRIPTION WITH REFERENCE TO THE DRAWINGS

Figure 1:
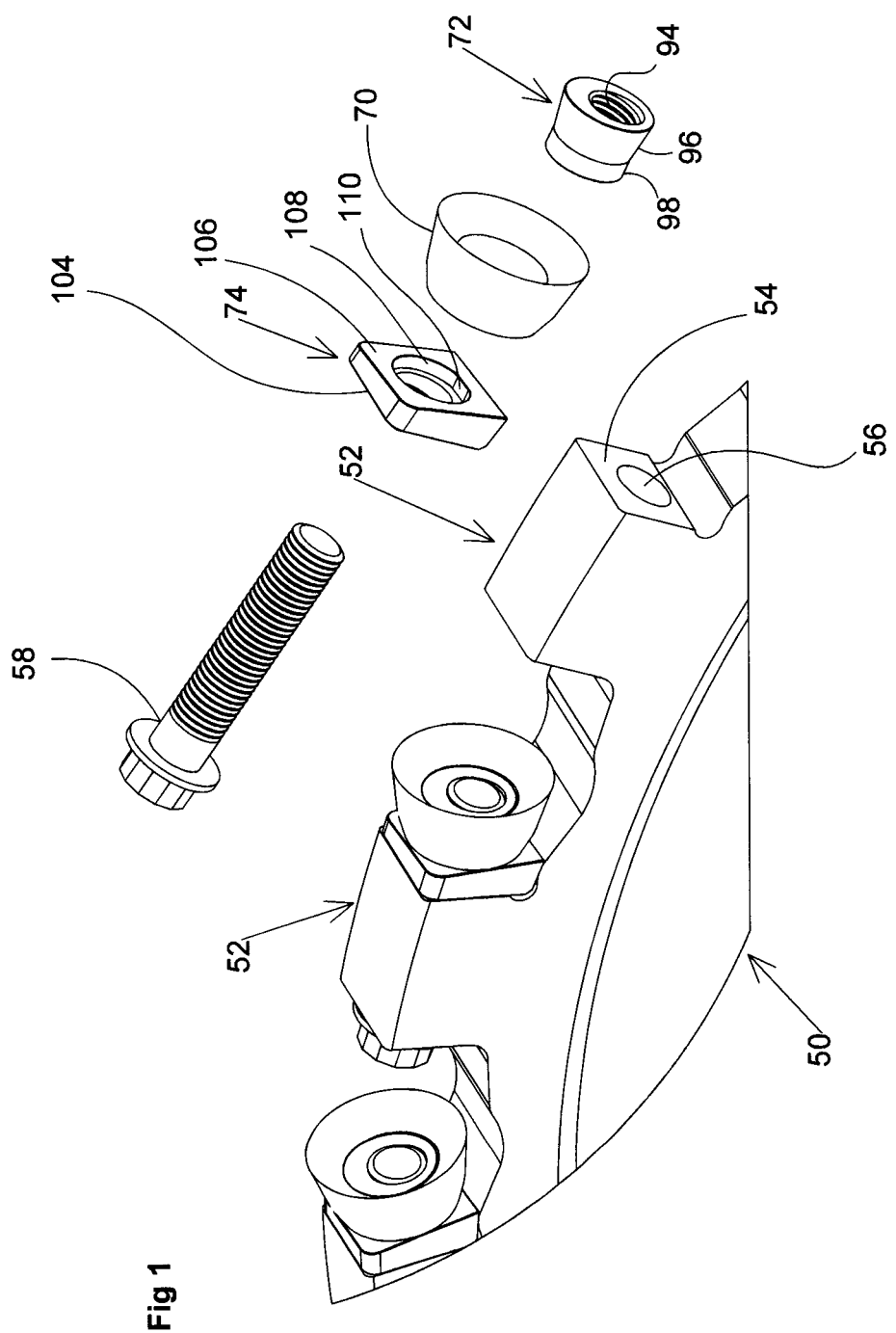
FIG. 1 is a perspective isolation view showing a portion of the circumferential periphery of a conventional saw disc with a circle-edge cutting tooth embodiment of the present invention, with examples shown both mounted and exploded with the associated mounting components.
Figure 2:
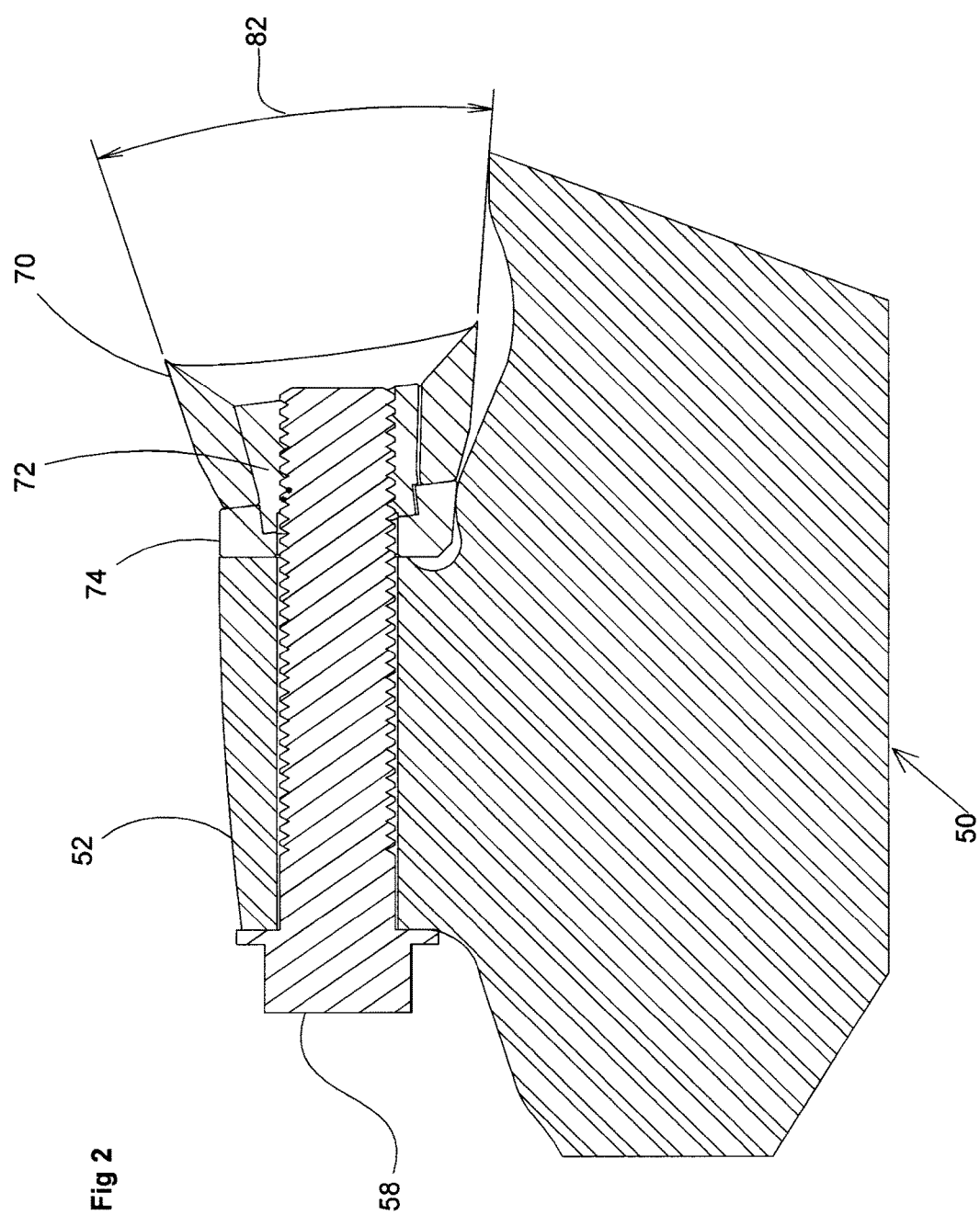
FIG. 2 is an isolation sectional view (normal to the plane of rotation of the saw disc) of a portion of the circumferential periphery of a conventional saw disc showing the circle-edge cutting tooth embodiment of FIG. 1 as mounted.
Figure 3:
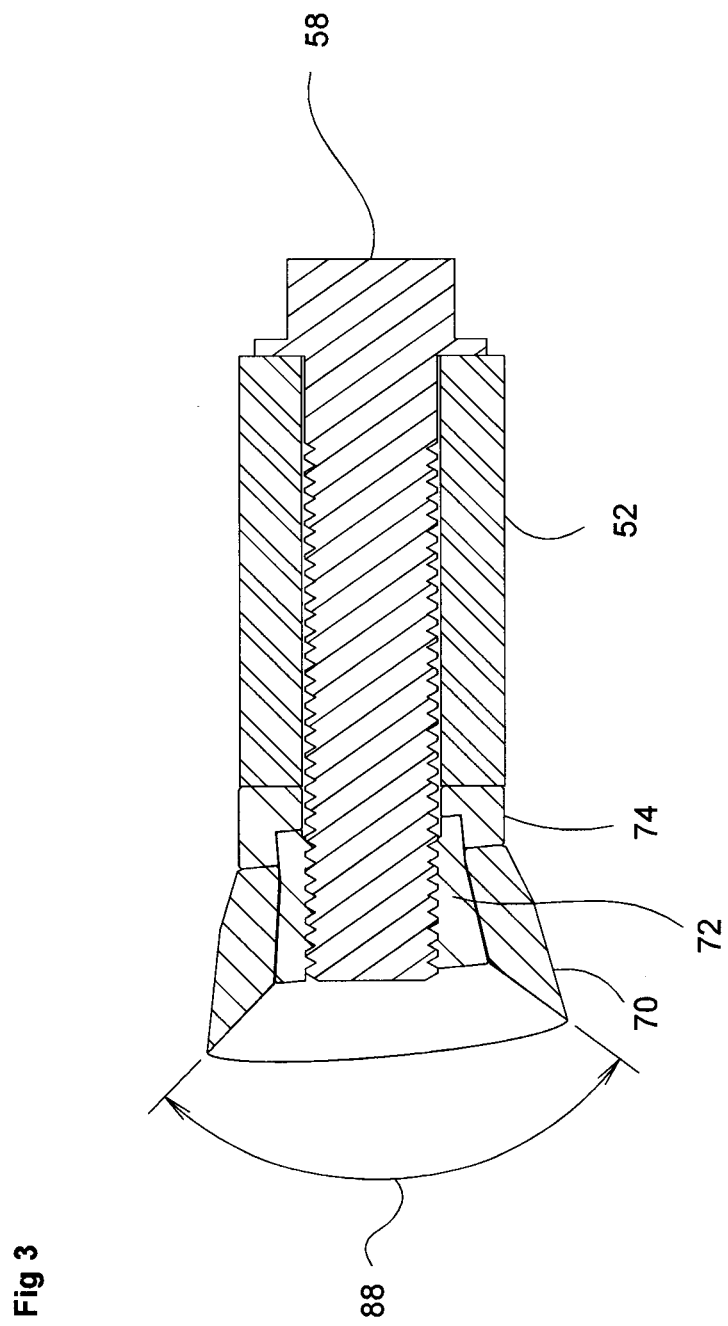
FIG. 3 is an isolation sectional view (parallel to the plane of rotation of the saw disc) of a portion of the edge of a conventional saw disc showing the circle-edge cutting tooth embodiment of FIG. 1 as mounted.
Figure 5:
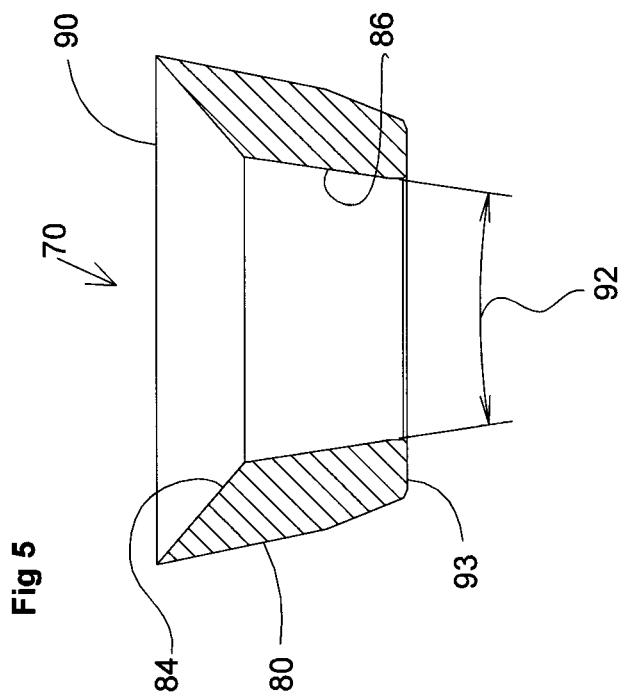
FIG. 5 is a sectional view of the circle-edge cutting tooth embodiment of FIG. 1
Figure 4:
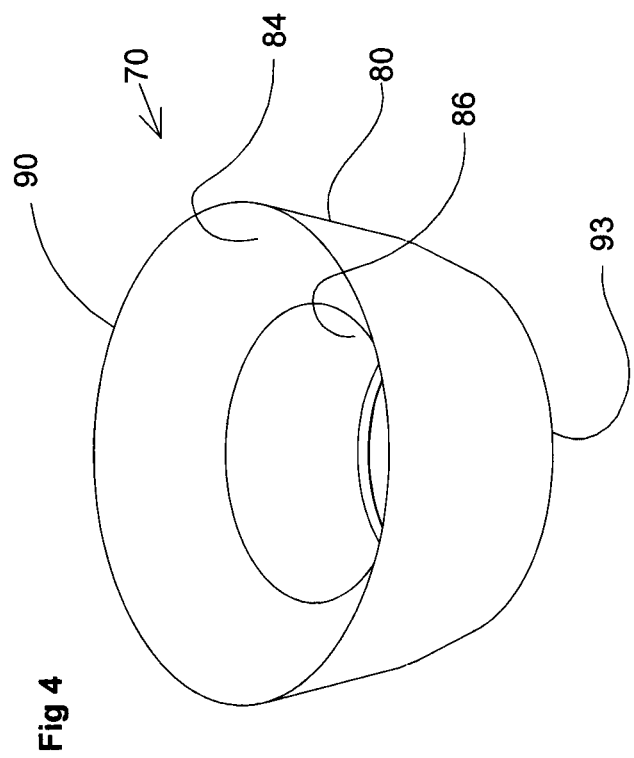
FIG. 4 is a perspective view of the circle-edge cutting tooth embodiment of FIG. 1.
Figure 6:
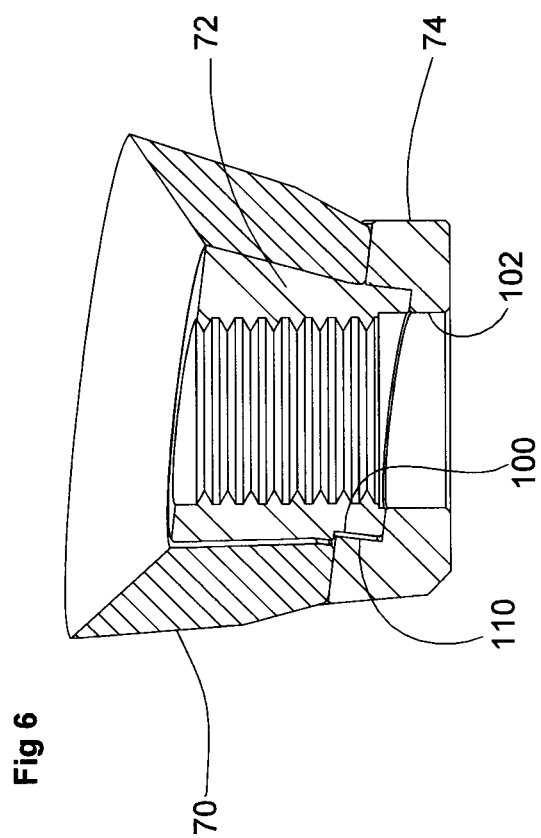
FIG. 6 is a sectional view of the circle-edge cutting tooth embodiment of FIG. 1 shown with associated offset retainer and adaptor/wear plate.

At times herein, feller buncher saw discs and associated components are described in terms of the axis of rotation and plane of rotation of the saw disc. At other times herein, although it is understood that in use a feller buncher saw disc may have various and changing orientations, saw discs and associated components are described as if the axis of rotation of the saw disc is vertical and the plane of rotation is horizontal, in that the terms "up" and "down" are used to refer to directions away from the plane of rotation.

As shown in the drawings, embodiments of the present invention include embodiments configured for mounting to a conventional saw disc 50, having multiple mount tangs 52 arrayed about the circumferential periphery of the conventional saw disc 50, each mount tang 52 having a tang tooth face 54 and a bolt hole 56. In use, with a conventional cutting tooth (not shown), a tooth bolt 58 is inserted through the bolt hole 56 to secure the conventional cutting tooth against the tang tooth face.

As shown in FIGS. 1-6, an embodiment of the present invention includes a circle-edge cutting tooth 70, an offset retainer 72 and an adaptor/wear plate 74.

The circle-edge cutting tooth 70 has the general external profile of a truncated right-circular cone, such that the circle-edge cutting tooth exterior 80 is essentially a section of a cone having a tooth exterior apex angle 82 of about 22 degrees. Internally, the circle-edge cutting tooth 70 has two general contours being the interior edge 84 and the retainer receiver 86. The interior edge 84 defines a section of a cone having an interior edge apex angle 88 of about 93 degrees. The circle-edge cutting tooth exterior 80 and the interior edge 84 meet at, and define, the circle cutting edge 90. The retainer receiver 86 defines a section of a cone having a retainer receiver apex angle 92 of about 22 degrees. The retainer receiver 86 extends between the inner edge 84 and the tooth base 93.

The offset retainer 72 has a retainer threaded bore 94, a retainer flare 96 and a retainer seat 98. The retainer flare 96 defines a section of a cone sized and configured to engage with the retainer receiver 86 so as to permit rotational movement of the circle-edge cutting tooth 70 relative to the offset retainer 72, while impeding movement of the circle-edge cutting tooth 70 away from the retainer seat 98. It will be apparent that other configurations of the retainer flare 96 and the retainer receiver 86 could provide the desired relative rotational freedom and retention, for example a general cylindrical configuration with an associated enlarged head. The retainer seat 98 includes a retainer flat 100. The retainer threaded bore 94 is configured to receive and threadedly engage a tooth bolt 58. The retainer threaded bore 94 is angled relative to a central axis generally defined by the retainer flare 96 and the retainer seat 98.

The adaptor/wear plate 74 has an adaptor bolt hole 102, an adaptor tang face 104, an adaptor tooth face 106 and a retainer socket 108 with a retainer socket flat 110.

The adaptor tang face 104 and adaptor tooth face 106 are each generally planar faces that are angled relative to each other. The retainer socket 108 is configured to receive the retainer seat 98 with the retainer flat 100 and retainer socket flat 110 engaged one with the other, so as to assist a user in positioning the offset retainer 72 in the desired relative rotational orientation and to impede movement from that desired orientation.

For installation on a conventional saw disc 50, the adaptor/wear plate 74 is positioned with the adaptor tang face 104 abutting the tang tooth face 54, the circle-edge cutting tooth 70 is positioned with the tooth base 93 abutting the adaptor tooth face 106, the offset retainer 72 is inserted into the retainer receiver 86 and retainer socket 108 (with the retainer flat 100 and retainer socket flat 110 aligned), and the offset retainer 72 is secured in position with the tooth bolt 58.

The general configuration of the circle-edge cutting tooth 70, offset retainer 72 and adaptor/wear plate 74 (including with respect to the relative angle between the adaptor tang face 104 and adaptor tooth face 106, and the angling of retainer threaded bore 94 relative to the retainer flare 96 and the retainer seat 98) are such that when installed the axis of rotation of the circle-edge cutting tooth 70 is at an angle of about 4 degrees relative to the plane of rotation of the conventional saw disc 50 and at an angle of about 7 degrees relative to a plane defined by the tang tooth face 54.

The angling of the axis of rotation of the circle-edge cutting tooth 70 relative to the plane of rotation of the conventional saw disc 50 tends to cause the circle-edge cutting tooth 70 to rotate responsive to contact with wood during cutting.

With the circle-edge cutting tooth 70 as described above and shown in the drawings, it is understood that a desirable rate of rotation (including in terms of cutting efficiency and rotation-induced wear) could be achieved with the angle of the axis of rotation of the circle-edge cutting tooth 70 relative to the plane of rotation of the conventional saw disc 50 being in the range of greater than 0 to about 7 degrees. It is understood that greater angles might be suitable with a cutting tooth that is more dish-shaped (i.e., flatter in general profile) than the circle-edge cutting tooth 70, however such greater angles would presumably introduce mounting complications in terms of the relative angle of rotation of such a dish-shaped cutting tooth with respect to the configuration of the mount tang 52 in the conventional saw disc 50.

The angle of the axis of rotation of the circle-edge cutting tooth 70 relative to the plane defined by the tang tooth face 54, is intended to give adequate clearance between the circle-edge cutting tooth 70 and the adjacent features of the conventional saw disc 50 so as to permit rotation of the circle-edge cutting tooth 70 without undue binding (as could perhaps result from a build up of cutting detritus, e.g. saw dust). It is understood that with the circle-edge cutting tooth 70 as described above and shown in the drawings, and a conventional saw disc 50, the angle of the axis of rotation of the circle-edge cutting tooth 70 relative to the plane defined by the tang tooth face 54, could be 0 degrees, if the configuration of the conventional saw disc 50 permitted, to as great as about 15 degrees. It is understood that a range of angles of about 6 degrees to about 8 degrees provides a usable functionality for many of the known conventional saw discs 50.

Figure 8:
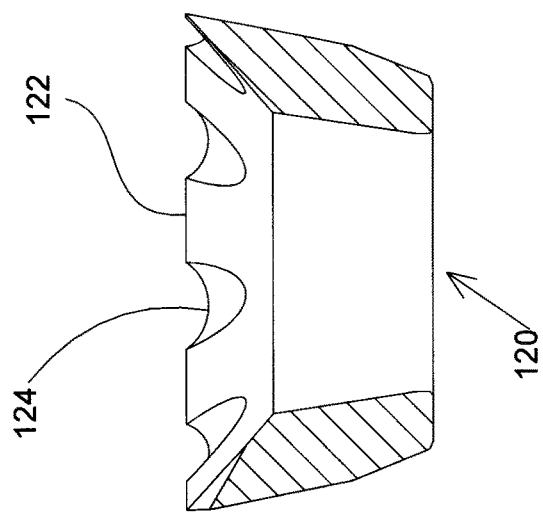
FIG. 8 is a sectional view of the serrated-edge cutting tooth embodiment of FIG. 7.
Figure 7:
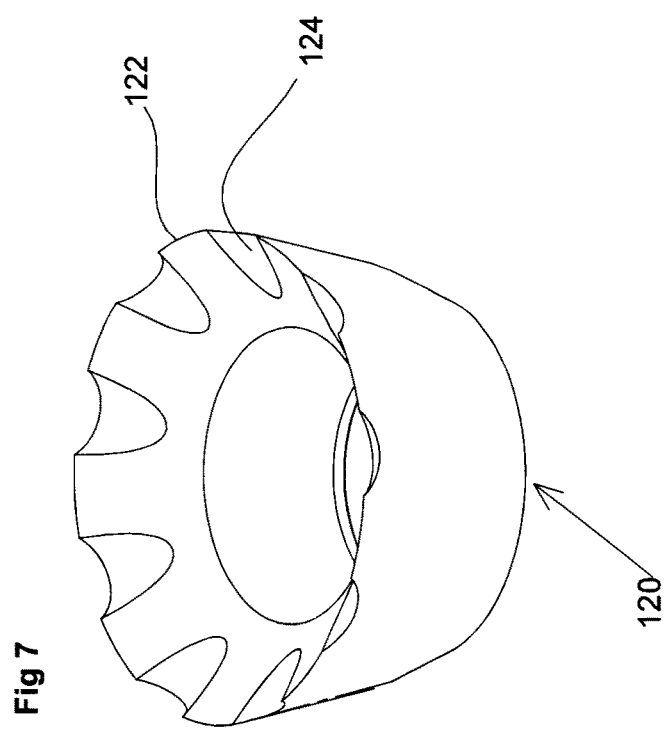
FIG. 7 is a perspective view of a serrated-edge cutting tooth embodiment of the present invention.

As shown in FIGS. 7 and 8, embodiments of the present invention include a serrated-edge cutting tooth 120, having the same general configuration and features as the circle-edge cutting tooth 70 except that the serrated-edge cutting tooth 120 has a serrated cutting edge 122 having curved declivities 124. In use, the serrated cutting edge 122 is understood to tend to cause intermittent, directionally random rotation of the serrated-edge cutting tooth 120 responsive to contact with wood during cutting. Thus, the serrated-edge cutting tooth 120 may be installed with the axis of rotation of the serrated-edge cutting tooth 120 substantially aligned with the plane of rotation of the conventional saw disc 50.

Figure 10:
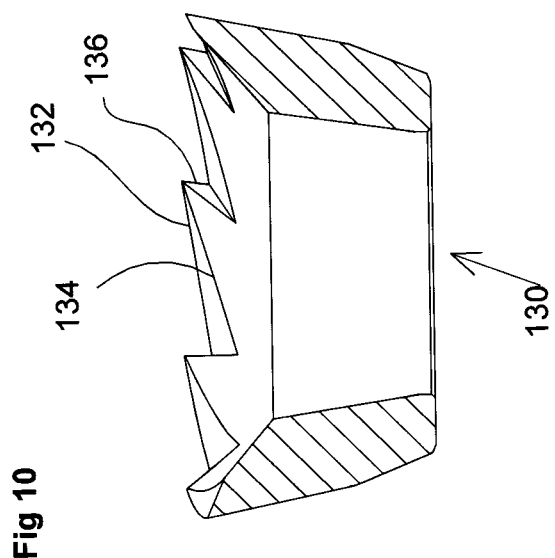
FIG. 10 is a sectional view of the asymmetrical-serrated-edge cutting tooth embodiment of FIG. 9.
Figure 9:
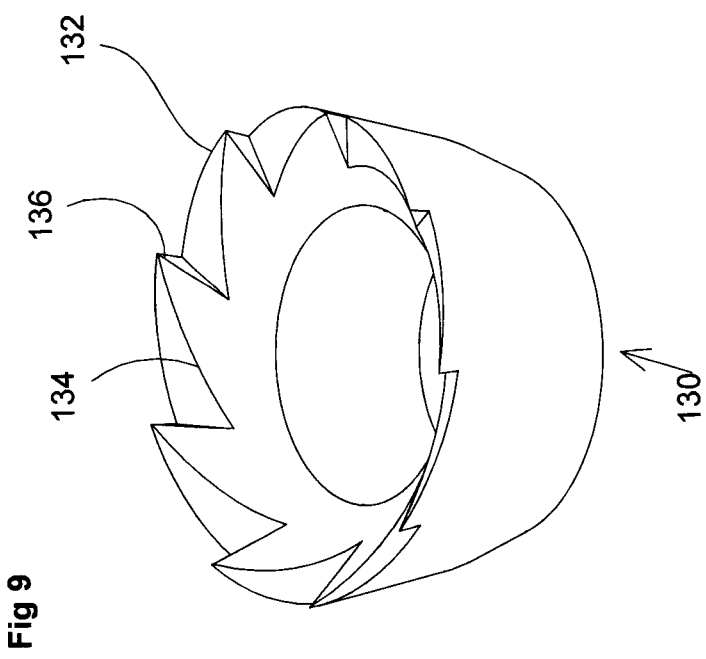
FIG. 9 is a perspective view of an asymmetrical-serrated-edge cutting tooth embodiment of the present invention.

As shown in FIGS. 9 and 10, embodiments of the present invention include an asymmetrical-serrated-edge cutting tooth 130, having the same general configuration and features as the circle-edge cutting tooth 70 except that the asymmetrical-serrated-edge cutting tooth 130 has a stepped cutting edge 132 having an array of angled runs 134 and projecting rises 136. In use, the stepped cutting edge 132 is understood to tend to cause rotation of the asymmetrical-serrated-edge cutting tooth 13 responsive to contact with wood during cutting. Thus, the asymmetrical-serrated-edge cutting tooth 13 may be installed with the axis of rotation of the serrated-edge cutting tooth 120 substantially aligned with the plane of rotation of the conventional saw disc 50.

A suitable material for all components is 20CRMO steel, hardened to 60HRC or 61 HRC or 62HRC. Other materials may also be suitable.

A further embodiment of the invention (not shown in the drawings) is a saw disc having mount tangs configured such that angled adaptor/wear plates and offset retainers are not necessary to achieve a desired angle of intersection between the circle-edge cutting tooth axis of rotation and the saw disc plane of rotation. That is, the bolt holes and tang tooth faces may be configured such that the longitudinal axis of the bolt hole (and thus of the tooth bolt when installed) is aligned with the circle-edge cutting tooth axis of rotation, and the plane defined by each tang tooth face is normal to the circle-edge cutting tooth axis of rotation. With such a saw disc configuration, it may be useful to interpose a wear plate between each rotatable tooth and the mount tang, but the opposed faces of the wear plate would be parallel rather than angled relative to each other.

The following terms and reference numbers are used herein: conventional saw disc 50; mount tang 52; tang tooth face 54; bolt hole 56; tooth bolt 58; circle-edge cutting tooth 70; offset retainer 72; adaptor/wear plate 74; circle-edge cutting tooth exterior 80; tooth exterior apex angle 82; interior edge 84; retainer receiver 86; interior edge apex angle 88; circle cutting edge 90; retainer receiver apex angle 92; tooth base 93; retainer threaded bore 94; retainer flare 96; retainer seat 98; retainer flat 100; bolt hole 102; adaptor tang face 104; adaptor tooth face 106; retainer socket 108; retainer socket flat 110; serrated-edge cutting tooth 120; serrated cutting edge 122; curved declivities 124; asymmetrical-serrated-edge cutting tooth 130; stepped cutting edge 132; angled runs 134; and projecting rises 136.

What is claimed is:
1. A cutting system comprising:
a generally circular, rotatable saw disc having a periphery and a disc plane of rotation;
a plurality of mounting tangs evenly spaced around the periphery of the saw disc;
a circular cutting tooth having a cutting edge to cut material as the saw disc is rotated, the cutting tooth being removably and rotatably mounted to each of the mounting tangs by a saw disc mounting system including:
a mounting tang bore defined in each of the mounting tangs, the mounting tang bore extending generally tangentially with respect to the rotation of the saw disc and terminating at a generally radially extending tang tooth face;
a bolt positioned within each of the mounting tang bores;
an adaptor plate having a centrally-disposed aperture, the adaptor plate being positioned on the bolt with the bolt passing through the aperture, and having a first face abutting the tang tooth face and a second face wherein the first and second adaptor faces are inclined with respect to each other;
a retainer that defines a retainer aperture, the retainer being positioned on the bolt with the bolt passing through the retainer aperture, the retainer being mounted in abutment with the adaptor plate; and
wherein the cutting tooth is rotatably mounted to the retainer so that as the saw disc is rotated to cut material, the cutting tooth will rotate on the retainer and a different portion of the cutting edge engages the workpiece as the cutting tooth rotates while the saw disc rotates.

2. The saw disc of claim 1 wherein the cutting tooth is replaceable by removing the retainer and the cutting tooth, fitting a replacement cutting tooth on the retainer, and mounting the retainer to the bolt.

3. The saw disc of claim 1 wherein the retainer is threaded onto the bolt.

4. The saw disc of claim 1 wherein the first face of the adaptor plate is perpendicular to the mounting tang bore.

5. The saw disc of claim 4 wherein the tang tooth face is perpendicular to the mounting tang bore.

6. The saw disc of claim 1 wherein each of the mounting tang bores extending tangentially with respect to the rotation of the saw disc and not radially outwardly.

7. The saw disc of claim 1 wherein the adaptor plate second face has an undercut portion that receives the retainer.

8. The saw disc of claim 1 wherein the retainer is stationary with respect to the saw disc when the saw disc is operating.

9. The saw disc of claim 1 wherein the bolt and the cutting tooth have axes, and the axis of the cutting tooth is offset with respect to the axis of the bolt.

10. The saw disc of claim 9 wherein the retainer has an axis that is coincident with the axis of the bolt.

11. The saw disc of claim 1 wherein the retainer is generally conical and the cutting tooth defines a generally conical internal opening complementing the configuration of the retainer.

12. The saw disc of claim 11 wherein the bolt and the retainer have proximal and distal ends in which the distal ends extend toward the cutting tooth, and wherein the larger end of the generally conical retainer and the larger end of the generally conical internal opening of the cutting tooth are distally disposed.

13. A cutting system comprising:
a generally circular, rotatable saw disc with at least one mounting tang having a tangentially-extending bore with a bolt positioned within the bore along a bore axis;
a circular cutting tooth having an internal opening through which the bolt extends; and
a cutting tooth mounting system for mounting the circular cutting tooth to the mounting tang, the cutting tooth mounting system including:
an adaptor plate defining a centrally-disposed aperture, the adaptor plate being positioned on the bolt with the bolt passing through the aperture, and having a first face abutting the mounting tang and a second face wherein the first and second adaptor faces are inclined with respect to each other;
a generally conical retainer defining a retainer aperture, the retainer aperture being disposed offset with respect to the bore axis such that the retainer is asymmetrically mounted with respect to the bore axis when mounted on the bolt; and
wherein the internal opening in the cutting tooth is generally conical and complementing the configuration of the retainer, the cutting tooth being rotatably and removably mounted to the retainer such that the cutting tooth is offset in such a manner that causes the cutting tooth to rotate responsive to contact with material as the saw disc rotates.

14. The system of claim 13 in which the retainer is threaded onto the bolt.

* * * * *